UNITED STATES PATENT OFFICE 2,430,667

CHLORINATION PROCESS

Oliver W. Cass and Harry B. Copelin, Niagara Falls, N. Y., assignors to E. I. du Pont de Nemours & Company, Wilmington, Del., a corporation of Delaware No Drawing. Application May 12, 1945, Serial No. 593,531

3 Claims. (Cl. 260—345)

The object of this invention is the preparation of chloro compounds by a new and improved procedure. A further object of this invention is the preparation of new and valuable chlorine compounds hitherto unavailable to the art. A still further object of this invention is to prepare these compounds by a chlorination procedure which is commercially feasible due to its simplicity and ease of operation.

The above objectives are realized by the chlorination of the heterocyclic compound furan

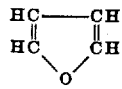

to yield a variety of chloro derivatives, proportions of which may be readily controlled by reaction conditions. These various chloro derivatives may be easily separated from each other by the customary procedures of fractional distillation or fractional crystallization. By the operation of our invention there is thus made available for the first time a commercially operative method for the preparation of these hitherto very expensive or completely unknown chemical intermediates.

It has hitherto before been thought impossible to directly chlorinate furan because of the extreme sensitivity of furan to the presence of small quantities of hydrogen chloride. These traces of hydrogen chloride caused extremely vigorous exothermic polymerization of furan resulting in the formation of large amounts of blank polymeric material. 2-chlorofuran has previously been prepared by the decomposition of the corresponding chlorinated furoic acid, a process which is economically unattractive. (J. A. C. S. 52:2083.)

We have now found that by careful observation of certain reaction conditions it is possible to chlorinate furan directly in either the liquid or the gaseous phase to yield a series of useful chlorine derivatives. The tendency of furan to polymerize when in contact with the hydrogen chloride which is secured as a by-product from the above chlorination is avoided by operating at a sufficiently low temperature (preferably below 0° C.) so that polymeriaztion is inhibited. When the polymerization of furan is thus prevented, a smooth chlorination of furan to the various chlorofurans becomes possible. Specific details of the invention are given in the following example.

Example

A closed, jacketed reaction vessel fitted with a reflux condenser, a stirring device, an inlet tube for chlorine, and a temperature recorder is charged with 136 parts by weight of furan together with 850 parts of methylene chloride. The reaction vessel and contents are then cooled to —40° C. by the circulation of an appropriate cooling medium through the jacket of the vessel. The reflux condenser is also cooled in this case to approximately 0° C. 227 parts by weight of chlorine are then slowly admitted either as vapor or as liquid through the inlet tube. Instantaneous reaction occurs as is evidenced by a rise in temperature. Cooling is increased and the flow of chlorine so regulated that the temperature is maintained at —40° C. During the addition of the latter portions of chlorine, hydrogen chloride is evolved and passes out through the cold reflux condenser. When the addition of chlorine is completed, the contents of the reaction vessel are permitted to slowly warm up, resulting in the liberation of additional quantities of hydrogen chloride. When the reactor contents have reached reflux temperature (30–35° C.), the reflux condenser is allowed to warm up to approximately 20° C. Under these conditions essentially all of the hydrogen chloride is removed from the reaction vessel without excessive formation of polyfuran. The contents of the reaction vessel are then subjected to fractional distillation at atmospheric pressure. There is secured a fraction of unchlorinated furan and methylene chloride boiling at a temperature of 30–42° C., which is returned to the next chlorination run. Following the separation of this fraction, the temperature rises rapidly to 77° C. at which point substantially pure 2-chlorofuran distills.

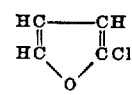

Following the separation of this compound a rapid rise in temperature results. A further fraction is then separated, boiling constantly at 115° C. This material is 2,5-dichlorofuran.

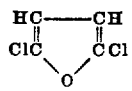

Following the separation of this material, the temperature again rises sharply, and a small quantity of 2,3,5-trichlorofuran is then secured, boiling constantly at 147° C.

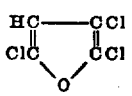

The relative ratio of these chlorination products which are produced when the proportions of furan and chlorine are as indicated in the above example are 9:4:1. If a larger proportion of the 2-chlorofuran is desired, the amount of chlorine added to the reaction vessel is decreased. If the amount of either dichloro or trichlorofuran is desired to be increased, larger amounts of chlorine are used. When amounts of chlorine equivalent to 3 or more moles chlorine per mole furan are used, higher chlorinated derivatives are secured as by-products.

Among these more highly chlorinated derivatives are 2,3,4,5-tetrachlorofuran (M. P. 46–48° C.)

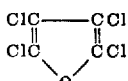

and hexachloro 2,5-dihydrofuran (B. P. 209–213° C.)

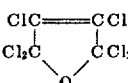

2-chlorofuran is a colorless liquid boiling at 77° C., having a density of 1.189 at 25° C. 2,5-dichlorofuran is a colorless liquid boiling at 115° C., having a density of 1.371 at 25° C. 2,3,5-trichlorofuran is a colorless oily liquid boiling at 147° C., having a density of 1.50 at 25° C. Tetrachlorofuran is a white solid melting at 46–48° C. and distilling under reduced pressure at 107–108° C. at 15 mm. Hexachloro 2,5-dihydrofuran as thus prepared by the direct chlorination of furan is a mixture of two isomeric forms. These forms exist as a colorless oil boiling without decomposition at 209–213° C. with a density of 1.694 at 20° C. By fractional crystallization it is possible to separate this mixture into two crystalline forms, one melting at 18° C., the other at 39–40° C. The chlorine content of both of these isomeric forms is identical, analysis for chlorine giving values from 76.15% to 76.60%, as compared with the theoretical 76.9%.

The reaction temperature is maintained below about 0° C. and preferably at −20 to −40° C. When the reaction is completed, the temperature is slowly elevated until substantially all the hydrogen chloride formed is driven off. Preferably the temperature is kept below 20° C. until substantially all the hydrogen chloride has escaped. The mixture then may be subjected to distillation to separate the products.

The various conventional chlorination solvents may be used as reaction solvents in practicing the invention. Preferably we use saturated chlorohydrocarbon solvents which are fairly resistant to chlorination at low temperatures; e. g., methylene chloride, chloroform, and carbon tetrachloride.

We claim:

1. The process which comprises reacting chlorine with a solution of furane at a temperature below 0° C. and thereafter warming the reaction mixture to a temperature not higher than about 20° C. until substantially all hydrogen chloride is driven off.

2. The process which comprises reacting chlorine with a solution of furane in a saturated chlorohydrocarbon at a temperature below 0° C. and thereafter warming the reaction mixture to a temperature not higher than about 20° C. until substantially all hydrogen chloride is driven off.

3. The process which comprises reacting chlorine with a solution of furane in a saturated chlorohydrocarbon at a temperature of −20 to −40° C. and thereafter warming the reaction mixture to a temperature not higher than about 20° C. until substantially all hydrogen chloride is driven off.

OLIVER W. CASS.
HARRY B. COPELIN.

REFERENCES CITED

The following references are of record in the file of this patent:

Chemical Abstracts, p. 5845² of 1939, vol. 33.
Chemical Abstracts, p. 3011¹ of 1930, vol. 24.
Beilstein, p. 28, vol. 17, 14th edition.
Beilstein, volume 17, page 21.

Certificate of Correction

Patent No. 2,430,667.                                       November 11, 1947.

OLIVER W. CASS ET AL.

It is hereby certified that errors appear in the printed specification of the above numbered patent requiring correction as follows: Column 1, line 33, for "blank" read *black*; column 4, line 45, list of references cited, for "14th edition" read *4th edition*; and that the said Letters Patent should be read with these corrections therein that the same may conform to the record of the case in the Patent Office.

Signed and sealed this 20th day of January, A. D. 1948.

[SEAL]

THOMAS F. MURPHY,
*Assistant Commissioner of Patents.*

The relative ratio of these chlorination products which are produced when the proportions of furan and chlorine are as indicated in the above example are 9:4:1. If a larger proportion of the 2-chlorofuran is desired, the amount of chlorine added to the reaction vessel is decreased. If the amount of either dichloro or trichlorofuran is desired to be increased, larger amounts of chlorine are used. When amounts of chlorine equivalent to 3 or more moles chlorine per mole furan are used, higher chlorinated derivatives are secured as by-products.

Among these more highly chlorinated derivatives are 2,3,4,5-tetrachlorofuran (M. P. 46–48° C.)

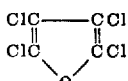

and hexachloro 2,5-dihydrofuran (B. P. 209–213° C.)

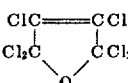

2-chlorofuran is a colorless liquid boiling at 77° C., having a density of 1.189 at 25° C. 2,5-dichlorofuran is a colorless liquid boiling at 115° C., having a density of 1.371 at 25° C. 2,3,5-trichlorofuran is a colorless oily liquid boiling at 147° C., having a density of 1.50 at 25° C. Tetrachlorofuran is a white solid melting at 46–48° C. and distilling under reduced pressure at 107–108° C. at 15 mm. Hexachloro 2,5-dihydrofuran as thus prepared by the direct chlorination of furan is a mixture of two isomeric forms. These forms exist as a colorless oil boiling without decomposition at 209–213° C. with a density of 1.694 at 20° C. By fractional crystallization it is possible to separate this mixture into two crystalline forms, one melting at 18° C., the other at 39–40° C. The chlorine content of both of these isomeric forms is identical, analysis for chlorine giving values from 76.15% to 76.60%, as compared with the theoretical 76.9%.

The reaction temperature is maintained below about 0° C. and preferably at −20 to −40° C. When the reaction is completed, the temperature is slowly elevated until substantially all the hydrogen chloride formed is driven off. Preferably the temperature is kept below 20° C. until substantially all the hydrogen chloride has escaped. The mixture then may be subjected to distillation to separate the products.

The various conventional chlorination solvents may be used as reaction solvents in practicing the invention. Preferably we use saturated chlorohydrocarbon solvents which are fairly resistant to chlorination at low temperatures; e. g., methylene chloride, chloroform, and carbon tetrachloride.

We claim:

1. The process which comprises reacting chlorine with a solution of furane at a temperature below 0° C. and thereafter warming the reaction mixture to a temperature not higher than about 20° C. until substantially all hydrogen chloride is driven off.

2. The process which comprises reacting chlorine with a solution of furane in a saturated chlorohydrocarbon at a temperature below 0° C. and thereafter warming the reaction mixture to a temperature not higher than about 20° C. until substantially all hydrogen chloride is driven off.

3. The process which comprises reacting chlorine with a solution of furane in a saturated chlorohydrocarbon at a temperature of −20 to −40° C. and thereafter warming the reaction mixture to a temperature not higher than about 20° C. until substantially all hydrogen chloride is driven off.

OLIVER W. CASS.
HARRY B. COPELIN.

REFERENCES CITED

The following references are of record in the file of this patent:

Chemical Abstracts, p. 5845[2] of 1939, vol. 33.
Chemical Abstracts, p. 3011[1] of 1930, vol. 24.
Beilstein, p. 28, vol. 17, 14th edition.
Beilstein, volume 17, page 21.

Certificate of Correction

Patent No. 2,430,667.  November 11, 1947.

OLIVER W. CASS ET AL.

It is hereby certified that errors appear in the printed specification of the above numbered patent requiring correction as follows: Column 1, line 33, for "blank" read *black*; column 4, line 45, list of references cited, for "14th edition" read *4th edition*; and that the said Letters Patent should be read with these corrections therein that the same may conform to the record of the case in the Patent Office.

Signed and sealed this 20th day of January, A. D. 1948.

[SEAL]

THOMAS F. MURPHY,
*Assistant Commissioner of Patents.*